US007835740B2

(12) United States Patent
Claussen et al.

(10) Patent No.: US 7,835,740 B2
(45) Date of Patent: Nov. 16, 2010

(54) ESTABLISHING CELL CODES FOR PICOCELLS WITHIN A MACROCELL

(75) Inventors: Holger Claussen, Swindon (GB); Hamid Reza Karimi, Kenley (GB); Lester Tse Wee Ho, Swindon (GB); Louis Gwyn Samuel, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 773 days.

(21) Appl. No.: 11/611,916

(22) Filed: Dec. 18, 2006

(65) Prior Publication Data
US 2008/0146226 A1    Jun. 19, 2008

(51) Int. Cl.
*H04W 4/00* (2009.01)
(52) U.S. Cl. .................. 455/435.1; 455/444; 455/436; 370/328; 370/338
(58) Field of Classification Search ............. 455/435.1, 455/436–444, 446, 448–449, 456.1–456.6, 455/461; 370/335, 342, 328, 338
See application file for complete search history.

(56) References Cited
U.S. PATENT DOCUMENTS

| 7,142,526 | B1* | 11/2006 | Hokao ................... 370/331 |
| 7,171,216 | B1* | 1/2007 | Choksi .................. 455/456.1 |
| 2002/0175854 | A1* | 11/2002 | Shioda et al. .......... 342/357.1 |
| 2004/0204097 | A1* | 10/2004 | Scheinert et al. ........... 455/561 |
| 2004/0235523 | A1* | 11/2004 | Schrire et al. ............. 455/558 |
| 2007/0213067 | A1* | 9/2007 | Li et al. .................. 455/444 |
| 2007/0293222 | A1* | 12/2007 | Vikberg et al. ........... 455/436 |
| 2008/0101301 | A1* | 5/2008 | Thomas et al. ............ 370/335 |

FOREIGN PATENT DOCUMENTS

| WO | 2005079083 A1 | 2/2004 |
| WO | 2005099185 A1 | 3/2004 |

OTHER PUBLICATIONS

International Search Report and Written Opinion of the International Searching Authority for International application No. PCT/US2007/024967 mailed Apr. 24, 2008.
International Preliminary Report on Patentability for International application No. PCT/US2007/024967 mailed Mar. 26, 2009.

* cited by examiner

*Primary Examiner*—Kamran Afshar
*Assistant Examiner*—Marisol Fahnert
(74) *Attorney, Agent, or Firm*—Carlson, Gaskey & Olds

(57) ABSTRACT

A wireless communication system has at least one picocell within a macrocell. A method of communicating in that system includes using a set of predefined cell codes for respectively identifying macrocells. At least one predefined cell code is used for identifying all picocells within a macrocell to the macrocell. A picocell code distinct from the predefined cell codes is used for uniquely identifying a picocell to a mobile station with the macrocell. The mobile station is able to translate between the predefined cell code used by the macrocell to identify all picocells and the picocell code used to uniquely identify the picocell to the mobile station.

14 Claims, 1 Drawing Sheet

ESTABLISHING CELL CODES FOR PICOCELLS WITHIN A MACROCELL

1. FIELD OF THE INVENTION

This invention generally relates to communication. More particularly, this invention relates to wireless communication.

2. DESCRIPTION OF THE RELATED ART

Wireless communication systems are well known and in widespread use. Many systems are referred to as cellular systems because of the way that wireless communication coverage is designed. Base station transceivers are arranged to provide wireless communication coverage over geographic areas surrounding the base station. The geographic area is typically referred to as a cell. Traditional base station transceivers provide relatively large geographic coverage and the corresponding cells can be referred to as macrocells.

It is possible to establish smaller-sized cells within a macrocell. These are sometimes referred to as picocells. One proposed way for establishing a picocell is to provide a picocell base station unit that operates within a relatively limited range within the coverage area of a macrocell. One example use of a picocell base station unit is to provide wireless communication coverage within a building, for example.

Various challenges are introduced by the possibility of having multiple picocells within a macrocell. It is necessary to be able to identify the picocells to facilitate accurate handovers between the macrocell and a desired picocell, for example. With the likely proliferation of many picocells, the task of identifying each of them uniquely becomes daunting.

In UMTS, for example, each macrocell base station is associated with one primary scrambling code that serves as a base station identifier or a cell code. The primary scrambling code is a complex sequence of 38400 chips and is repeated every 10 mS. A mobile station identifies a base station using the primary common pilot channel transmitted by the base station, which is scrambled by the primary scrambling code. In UMTS a total of 512 scrambling codes are defined in order to keep the cell search procedure manageable. It is not possible to simply increase the specified number of scrambling codes (e.g., to add more than the existing 512 UMTS scrambling codes) because this would increase the cell search complexity for user equipment.

In CDMA systems, a pseudo random noise offset (PN offset) is used instead of a scrambling code. PN offsets are cell codes within CDMA systems that have corresponding functions to the scrambling codes within UMTS systems. The number of PN offsets needs to be limited to keep cell search procedures manageable CDMA systems.

For purely macro-cellular wireless communication system deployment, the existing number of scrambling codes and PN offsets is sufficient. This does not remain true when multiple picocells are established within a large number of macrocells. Introducing more picocells eventually would require reusing the scrambling codes for the picocells within a macrocell, which could result in false handovers from a macrocell to an incorrectly identified picocell.

Additionally, it is necessary to generate a user-specific neighbor list that includes candidate cells that a mobile station can consider. In addition to the existing macrocells, it will become necessary to include a user's home picocell within the neighbor list. While creating a unique neighbor list for each user is one possibility, there are additional costs, complexity and signaling overheads on the network side, which render such an approach undesirable.

It may be possible to manually plan scrambling code use for identifying picocells. Such an approach, however, is undesirably time-consuming and expensive. Moreover, as picocells become more prevalent, even manual planning may not sufficiently allocate existing scrambling codes in a manner that avoids false handovers.

There is a need for an efficient arrangement for identifying picocells within a macrocell in a manner that facilitates accurate handovers between a macrocell and a desired picocell.

SUMMARY

An exemplary method of communicating in a system having at least one picocell within a macrocell includes using a set of predefined cell codes for respectively identifying macrocells. At least one predefined cell code is used for identifying all picocells within the macrocell. A picocell code distinct from the predefined cell codes is used for uniquely identifying a selected one of the picocells to a mobile station within the macrocell.

The various features and advantages of a disclosed example will become apparent to those skilled in the art from the following detailed description. The drawings that accompany the detailed description can be briefly described as follows.

DETAILED DESCRIPTION

Figure 1:
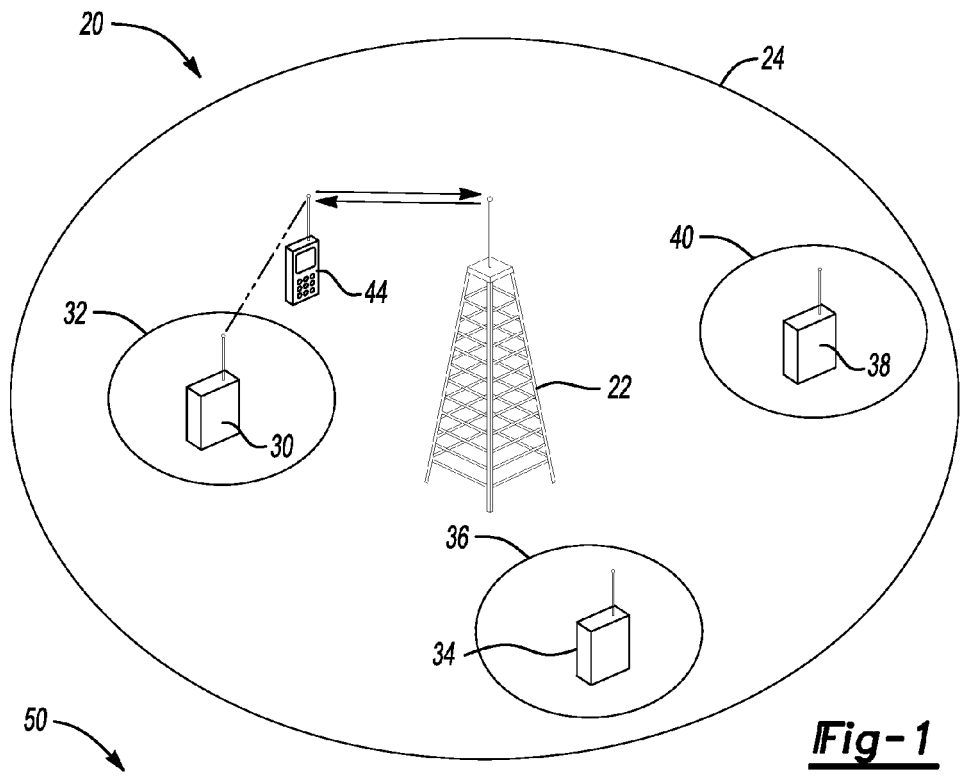
FIG. 1 schematically shows selected portions of a wireless communication system that is useful with an embodiment of this invention.

FIG. 1 schematically illustrates selected portions of a communication system 20. A base station 22 includes a base station transceiver unit and appropriate radio communication equipment for conducting wireless communications in a generally known manner. The base station 22 establishes a wireless communication coverage area 24 that is referred to as a macrocell for purposes of discussion. The geographic region of the macrocell 24 will depend on, in part, the capabilities of the base station 22 and the surrounding geography. There are known techniques for establishing a desired macrocell coverage area.

Within the macrocell 24, a picocell base station unit (PCBSU) 30 provides wireless communication coverage within a picocell 32. As can be appreciated from the illustration, the size of the coverage area of the picocell 32 is much smaller than that of the macrocell 24. The illustration is not to scale but the point is that the picocell coverage area of the picocell 32 is much smaller than that of the macrocell 24. In one example, the picocell 32 corresponds to the user's home.

Another PCBSU 34 provides wireless coverage within a picocell 36. Still another PCBSU 38 provides a picocell coverage area 40.

It is possible for a mobile station 44 within the macrocell 24 to communicate with the macrocell by communicating with the base station 22 in a known manner. When the mobile station 44 enters into a picocell area where that mobile station is authorized for communications within the picocell, it will be desirable to handover from the macrocell 24 to the corresponding picocell. In the illustrated example, the user of the mobile station 44 has rights for using the communication capabilities of the PCBSU 30 for communicating within the picocell 32.

The illustrated example includes an approach for uniquely identifying each picocell so that the mobile station 44 can accurately handover between the macrocell 24 and an appropriate picocell.

Figure 2:
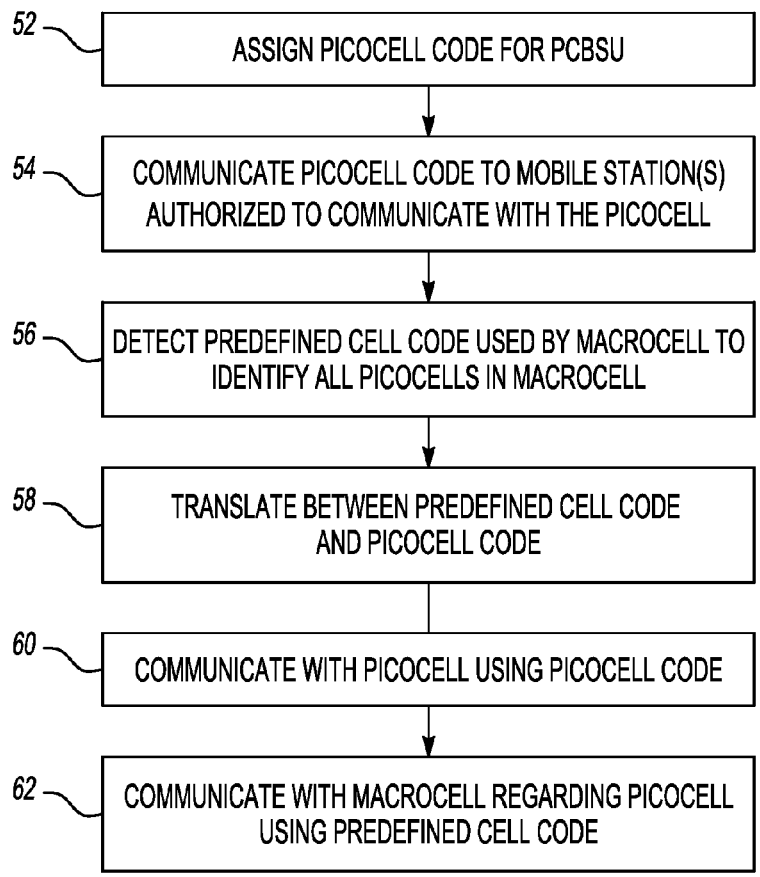
FIG. 2 is a flowchart diagram summarizing one example approach.

FIG. 2 includes a flowchart diagram 50 summarizing one example approach. Each picocell is assigned a picocell code at 52. In one example, the picocell codes are distinct from the cell codes used for the macrocell 24 and other macrocells (not illustrated). In a UMTS example, the picocell code is distinct from the predefined 512 scrambling codes used as cell codes. In a CDMA example, the picocell code is distinct from the predefined PN offsets currently used as cell codes in CDMA systems.

Once the picocell code is established for a PCBSU and the PCBSU is placed in use, the picocell code is communicated to any mobile station that is authorized to communicate with that picocell at 54.

In an example where the picocell code is a scrambling code, the scrambling code sequence length of 38400 chips used in UMTS allows for defining up to $4^{384400}$ different scrambling codes. This allows for a distinct scrambling code or picocell code to be assigned to virtually every picocell within a macrocell and within a group of surrounding macrocells. The manner of assigning the picocell code may be by generating the picocell code in a manner similar to the standardized 512 gold codes, the picocell code may be pre-configured by a supplier of the PCBSU or the picocell code may be chosen randomly. Given this description, those skilled in the art will be able to select an appropriate way for choosing picocell codes for each PCBSU.

At 56, a predefined cell code is used by the macrocell to identify all picocells in the macrocell. In one example, a single one of the predefined 512 UMTS scrambling codes is reserved as an identifier of all picocells within a macrocell. The single predefined cell code identifies all picocells to the macrocell. Accordingly, using a single cell code allows for providing a neighbor list to any mobile station within the macrocell that includes all of the possible picocells, at least from the perspective of the macrocell and the associated network. The macrocell, therefore, need only communicate the selected predefined cell code to any mobile station within the macrocell as part of the neighbor list and need not keep track of multiple picocell identifiers including the unique picocell codes assigned at 52.

The mobile station 44 has the capability of translating between the selected predefined cell code that identifies all picocells to the macrocell and the unique picocell code associated with a PCBSU with which the mobile station is authorized to communicate.

The example of FIG. 2 includes translating between the predefined cell code that identifies all picocells to the macrocell and the picocell code that is unique to a selected picocell at 58. In one example, the mobile station 44 includes a translator that performs a cell code translation from the identifier used by the macrocell to the unique PCBSU picocell code so that the mobile station 44 can communicate with the macrocell, the picocell or both. In one example, a translator program or module is stored in the mobile station. One example includes a software applet downloaded onto the SIM card of the mobile station.

As shown at 60, the mobile station 44 communicates with the picocell using the picocell code. At 62, the mobile station 44 communicates with the macrocell regarding the picocell using only the predefined cell code that identifies all picocells to the macrocell. The unique picocell code associated with each PCBSU is invisible to the macrocell.

For example, when it is desirable for a mobile station to handover from the macrocell 24 to a picocell, the base station 22 communicates with the mobile station 44 including an identification of the predefined cell code that identifies all picocells to the macrocell. The mobile station 44 receives this communication and interprets the predefined cell code as an indication that it needs to translate to its predetermined, corresponding picocell code of the picocell within which the mobile station is authorized to communicate. The mobile station then uses the picocell code and obtains a signal measurement of the picocell, for example. The mobile station 44 then communicates the signal measurement back to the macrocell base station 22 using the predefined cell code that identifies all picocells to the macrocell. In other words, the mobile station 44 uses the picocell code for communications directly with the picocell and reports back to the macrocell regarding such communications as if they were associated with the predefined cell code used by the macrocell for identifying all picocells (e.g., one of the 512 original UMTS scrambling codes).

When the mobile station is leaving the picocell 32, for example, it uses the predefined cell code that identifies all picocells to the macrocell as it communicates with the macrocell base station 22 during a handover to the macrocell, for example.

From the network perspective, all PCBSUs use the same cell code (e.g., scrambling code or PN offset). This makes configuration simple by adding the selected predefined code or codes permanently to a measured set. As a result, no user-specific neighbor list is required at the macrocell or network level. At the same time, from the mobile station perspective, the PCBSU picocell code is unique for an appropriate picocell when the mobile station translates between the picocell code and the predefined cell code used by the macrocell for identifying all picocells.

The disclosed example allows for using unique scrambling codes or PN offsets for each picocell within a macrocell and removes the need for cell code planning for purposes of avoiding false handovers. Each picocell within a macrocell can have a picocell code that is unique to that picocell compared to all other picocells within a selected vicinity.

It is possible to use more than one of the predefined cell codes to identify picocells to one or more macrocells.

The disclosed example allows for using more than the predefined set of cell codes recognized in UMTS or CDMA systems as picocell identifiers without increasing the cell search complexity because one of the predefined, recognized cell codes is used by the macrocell for identifying all picocells within the macrocell. Translating between the picocell code and the predefined cell code allows a mobile station to effectively communicate with a macrocell on the one hand and a picocell on the other hand. Additionally, the disclosed example eliminates the need for any user-specific neighbor list. By having unique picocell codes associated with each picocell within a macrocell, incorrect handover attempts to incorrectly identified picocells are essentially eliminated. Accordingly, the disclosed example provides the advantage of simplifying the implementation of an overlay network within an existing macrocellular underlay network in an economical manner.

The preceding description is exemplary rather than limiting in nature. Variations and modifications to the disclosed examples may become apparent to those skilled in the art that do not necessarily depart from the essence of this invention.

The scope of legal protection given to this invention can only be determined by studying the following claims.

We claim:

1. A method of communicating in a system having at least one picocell within a macrocell, comprising the steps of:
   using a set of predefined cell codes for respectively identifying macrocells;
   using at least one predefined cell code for identifying all picocells within the macrocell to the macrocell; and
   using a picocell code distinct from the predefined cell codes for uniquely identifying a selected one of the picocells to a mobile station within the macrocell,
      the mobile station translating from the at least one predefined cell code to the picocell code of the selected picocell responsive to the mobile station receiving the at least one predefined cell code from the macrocell, the mobile station translating from the picocell code of the selected picocell to the at least one predefined cell code when the mobile station communicates with the macrocell regarding the selected picocell.

2. The method of claim 1, comprising
   transmitting the at least one predefined cell code to a mobile station;
   receiving a power measurement from the mobile station associated with the at least one predefined cell code that is indicative of a power measurement of the mobile station regarding the selected one of the picocells.

3. The method of claim 2, comprising
   determining whether the received power measurement suggests a handover from the macrocell to the selected one of the picocells; and
   using the at least one predefined cell code to instruct the mobile station to handover from the macrocell to the selected one of the picocells.

4. The method of claim 1, comprising
   establishing a neighbor set for the mobile station including the at least one predefined cell code.

5. The method of claim 1, comprising
   receiving a communication from the macrocell including the at least one predefined cell code;
   determining the picocell code based upon the received communication; and
   responsively communicating with the selected one of the picocells uniquely identified by the picocell code.

6. The method of claim 5, comprising
   determining a power measurement between the mobile station and the selected one of the picocells; and
   reporting the power measurement to the macrocell in association with the at least one predefined cell code.

7. The method of claim 1, comprising
   assigning a different picocell code to each picocell within a vicinity of other picocells such that each such picocell is uniquely identified relative to the other such picocells.

8. The method of claim 1, wherein the predefined cell codes each comprise
   one of a predefined set of scrambling codes; or
   one of a predefined set of pseudo random noise offsets.

9. A wireless communication mobile station, comprising
   a translator configured to recognize a predefined cell code used by a macrocell for identifying all picocells within the macrocell and to translate between the predefined cell code and a picocell code that uniquely identifies a selected picocell within the macrocell; and
   a transceiver configured to allow the mobile station to communicate with the macrocell and the picocell,
      the translator translating from the predefined cell code to the picocell code responsive to receiving the predefined cell code from the macrocell, the translator translating from the picocell code to the predefined cell code when the mobile station notifies the macrocell regarding the selected picocell.

10. The wireless communication mobile station of claim 9, wherein the translator is configured to interpret a communication from a macrocell including the predefined cell code as a communication directing the mobile station to take a signal measurement from the selected picocell identified by the picocell code.

11. The wireless communication mobile station of claim 10, wherein the translator is configured to report a corresponding signal measurement from the selected picocell in association with the predefined cell code to the macrocell.

12. The wireless communication mobile station of claim 9, wherein the predefined cell code comprises
   one of a predefined set of scrambling codes; or
   one of a predefined set of pseudo random noise offsets.

13. The wireless communication mobile station of claim 12, wherein the picocell code comprises one of a scrambling code or a pseudo random noise offset that is distinct from the corresponding predefined set of scrambling codes or pseudo random noise offsets.

14. The wireless communication mobile station of claim 9, comprising
   a SIM card and wherein the translator comprises software stored on the SIM card.

\* \* \* \* \*